United States Patent
Taoka et al.

(10) Patent No.: US 8,767,664 B2
(45) Date of Patent: Jul. 1, 2014

(54) MOBILE TERMINAL APPARATUS, RADIO BASE STATION APPARATUS AND RADIO COMMUNICATION METHOD

(75) Inventors: Hidekazu Taoka, Tokyo (JP); Nobuhiko Miki, Tokyo (JP); Teruo Kawamura, Tokyo (JP); Yuichi Kakishima, Tokyo (JO)

(73) Assignee: NTT DoCoMo, Inc., Tokyo (JP)

( * ) Notice: Subject to any disclaimer, the term of this patent is extended or adjusted under 35 U.S.C. 154(b) by 40 days.

(21) Appl. No.: 13/579,104

(22) PCT Filed: Feb. 9, 2011

(86) PCT No.: PCT/JP2011/052697
§ 371 (c)(1),
(2), (4) Date: Oct. 23, 2012

(87) PCT Pub. No.: WO2011/102267
PCT Pub. Date: Aug. 25, 2011

(65) Prior Publication Data
US 2013/0033979 A1    Feb. 7, 2013

(30) Foreign Application Priority Data
Feb. 19, 2010    (JP) .................... 2010-034551

(51) Int. Cl.
*H04W 4/00* (2009.01)
*H04L 1/18* (2006.01)

(52) U.S. Cl.
CPC .................. *H04L 1/1816* (2013.01)
USPC ........................................................ 370/329

(58) Field of Classification Search
CPC ... H04L 1/1812; H04L 1/1816; H04L 1/1819; H04L 1/1607; H04L 1/1861; H04L 1/1864
USPC ................. 370/252, 328, 329, 335; 455/450–452.2; 714/748
See application file for complete search history.

(56) References Cited

U.S. PATENT DOCUMENTS

| | | | |
|---|---|---|---|
| 2010/0202433 A1* | 8/2010 | Ihm et al. | 370/343 |
| 2010/0251057 A1 | 9/2010 | Hoshino et al. | |
| 2010/0315989 A1* | 12/2010 | Reznik et al. | 370/315 |
| 2012/0051310 A1* | 3/2012 | Cho et al. | 370/329 |

FOREIGN PATENT DOCUMENTS

WO    2009/066406 A1    5/2009

OTHER PUBLICATIONS

Office Action for Japanese Patent Application No. 2010-034551 dated May 22, 2012, with English translation thereof (4 pages).

(Continued)

*Primary Examiner* — Kerri Rose

(74) *Attorney, Agent, or Firm* — Osha Liang LLP

(57) ABSTRACT

Provided are a mobile terminal apparatus, a radio base station apparatus and a radio communication method, capable of saving PHICH resources enough and realizing effective retransmission control of uplink SU-MIMO. The radio communication method of the present invention is characterized in that a radio base station apparatus receives signals of plural codewords, when there is an error in each of the codewords, generates a one-bit negative response physical HARQ indicator channel signal and transmits the physical HARQ indicator channel signal, and a mobile terminal apparatus receives the physical HARQ indicator channel signal and transmits retransmission signals of all the codewords to the radio base station apparatus based on the negative response physical HARQ indicator channel signal.

6 Claims, 15 Drawing Sheets

(56) References Cited

OTHER PUBLICATIONS

3GPP TSG RAN WG1 #56 R1-090588, "Further Analysis on Uplink SU-MIMO for E-UTRA," Texas Instruments, Athens, Greece, Feb. 9-13, 2009 (9 pages).

International Search Report w/translation from PCT/JP2011/052697 mailed Apr. 12, 2011 (2 pages).

3GPP TS 36.321 V9.3.0; "3rd Generation Partnership Project; Technical Specification Group Radio Access Network; Evolved Universal Terrestrial Radio Access (E-UTRA); Medium Access Control (MAC) protocol specification (Release 9)"; Jun. 2010 (48 pages).

3GPP TR 36.814 V1.6.0; "3rd Generation Partnership Project; Technical Specification Group Radio Access Network; Further Advancements for E-UTRA Physical Layer Aspects (Release 9)"; Jan. 2010, pp. 7-11 (6 pages).

\* cited by examiner

MOBILE TERMINAL APPARATUS, RADIO BASE STATION APPARATUS AND RADIO COMMUNICATION METHOD

TECHNICAL FIELD

The present invention relates to a mobile terminal apparatus, a radio base station apparatus and a radio communication method, capable of effectively implementing uplink SU-MIMO (Single User Multiple Input Multiple Output) retransmission control in the LTE-A (Long Term Evolution-Advanced) system.

BACKGROUND ART

In the LTE (Long Term Evolution) system provided in the 3GPP ($3^{rd}$ Generation Partnership Project), it has been proposed to apply Synchronous Hybrid Automatic Repeat Request (NPL 1). As illustrated in FIG. 1, when an uplink PUSCH (Physical Uplink Shared Channel) signal is first transmission, transmission acknowledgement information (ACK/NAC) is transmitted by the PHICH (Physical Hybrid Automatic Repeat Request Indicator Channel). When a mobile terminal apparatus receives NAC in the PHICH, the uplink PUSCH signal is retransmitted at predetermined intervals (RTD: Round Trip Delay, 8 msec) (Non-adaptive retransmission). In this case, the mobile terminal apparatus retransmits the PUSCH signal in the same resource (RB: Resource Block).

In the meantime, in the LTE system, when the PUSCH signal is retransmitted in the same RB by Non-adaptive retransmission, it may interfere with another UE signal (for example, PRACH (Physical Random Access Channel) signal). Accordingly, as illustrated in FIG. 1, it is also proposed to retransmit the PUSCH signal in a different RB in retransmission (adaptive retransmission). In this case, the mobile terminal apparatus receives RB allocation information used for retransmission in the downlink control channel (UL grant of PDCCH (Physical Downlink Control Channel)).

Further in the LTE system, in order to achieve much faster transmission, the MIMO transmission using plural transmission/reception antennas is adopted in the radio base station apparatus. Further, in the LTE-Advanced (LTE-A) system, which aims to achieve a more broader band and a more faster transmission rate, the MIMO multiplexing transmission is performed of a maximum of 8 streams in the downlink and a maximum of 4 streams in the uplink. In the MIMO multiplexing transmission, multi codeword transmission is performed which is capable of different MCS (Modulation and Coding Scheme) controls and HARQ controls among streams. Here, the maximum number of codewords is 2 irrespective of the number of antennas.

CITATION LIST

Non-Patent Literature

Non-Patent Literature 1: TS36.321 Sec5.4.2.1, 5.4.2.2

SUMMARY OF INVENTION

Technical Problem

In the uplink MIMO multiplexing transmission, when different HARQ controls are applied to streams, the simplest way is to prepare PHICH resources of 2 codewords. However, when the PHICH resources are doubled, there arises a problem that it may be difficult to assure the PHICH resources adequately to accommodate plural users.

The present invention was carried out in view of the foregoing and aims to provide a mobile terminal apparatus, a radio base station apparatus and a radio communication method, which are capable of adequately ensuring PHICH resources and efficiently implementing uplink SU-MIMO retransmission control.

Solution to Problem

A mobile terminal apparatus according to the present invention comprises: receiving section configured to receive a physical HARQ indicator channel signal; determining section configured to determine whether the physical HARQ indicator channel signal is a positive response (ACK) or a negative response (NACK); and transmitting section configured to, when the physical HARQ indicator channel signal is the negative response, transmit retransmission signals for all codewords to a radio base station apparatus.

A radio base station apparatus according to the present invention comprises: receiving section configured to receive signals of plural codewords; physical HARQ indicator channel signal generating section configured to generate a one-bit negative response physical HARQ indicator channel signal when there is an error in each of the codewords; and transmitting section configured to transmit the one-bit negative response physical HARQ indicator channel signal.

A radio communication method according to the present invention comprises: in a radio base station apparatus, receiving signals of plural codewords; when there is an error in each of the codewords, generating a one-bit negative response physical HARQ indicator channel signal; transmitting the one-bit negative response physical HARQ indicator channel signal; in a mobile terminal apparatus, receiving the one-bit negative response physical HARQ indicator channel signal; and transmitting retransmission signals of all the codewords to the radio base station apparatus based on the one-bit negative response physical HARQ indicator channel signal.

Technical Advantages of Invention

According to the present invention, the radio base station apparatus receives signals of plural codewords, when there is an error for each of the codewords, generates a one-bit negative response physical HARQ indicator channel signal and transmits the negative response physical HARQ indicator channel signal, and a mobile terminal apparatus receives the negative response physical HARQ indicator channel signal and transmits retransmission signals for all the codewords to the radio base station apparatus based on the negative response physical HARQ indicator channel signal. With this structure, it is possible to realize effective retransmission control of uplink SU-MIMO while saving PHICH resources enough.

DESCRIPTION OF EMBODIMENTS

Figure 1:
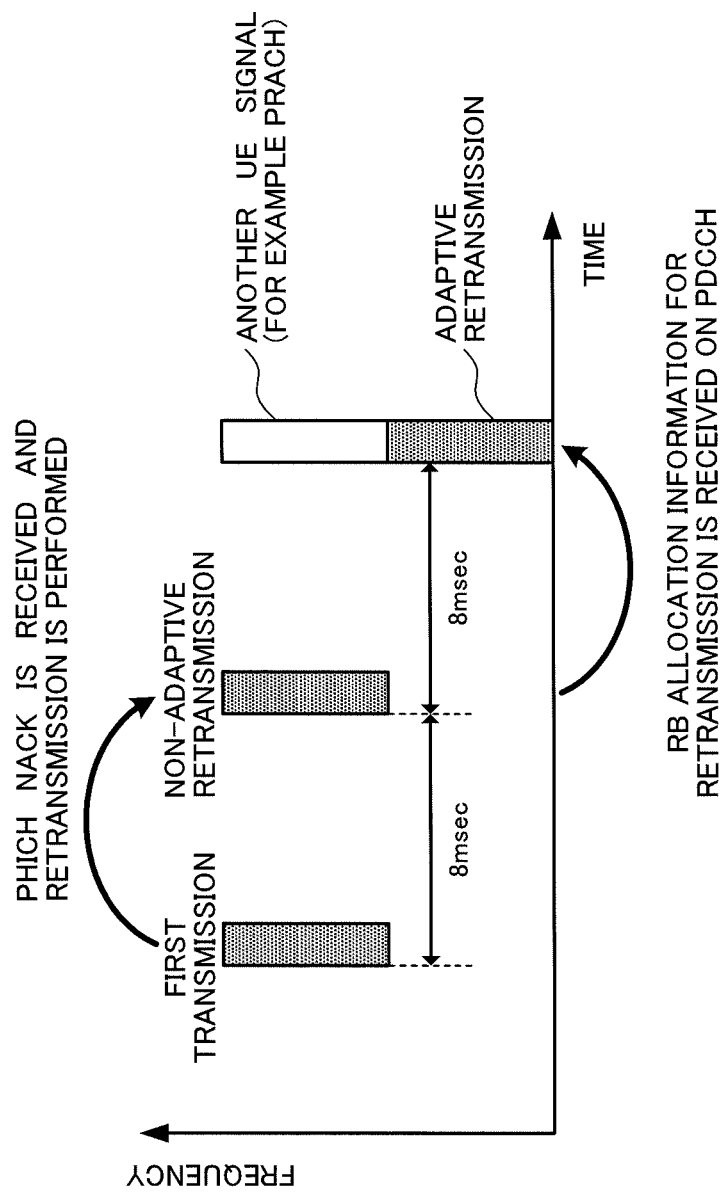
FIG. 1 is a view for explaining HARQ control.
Figure 2:
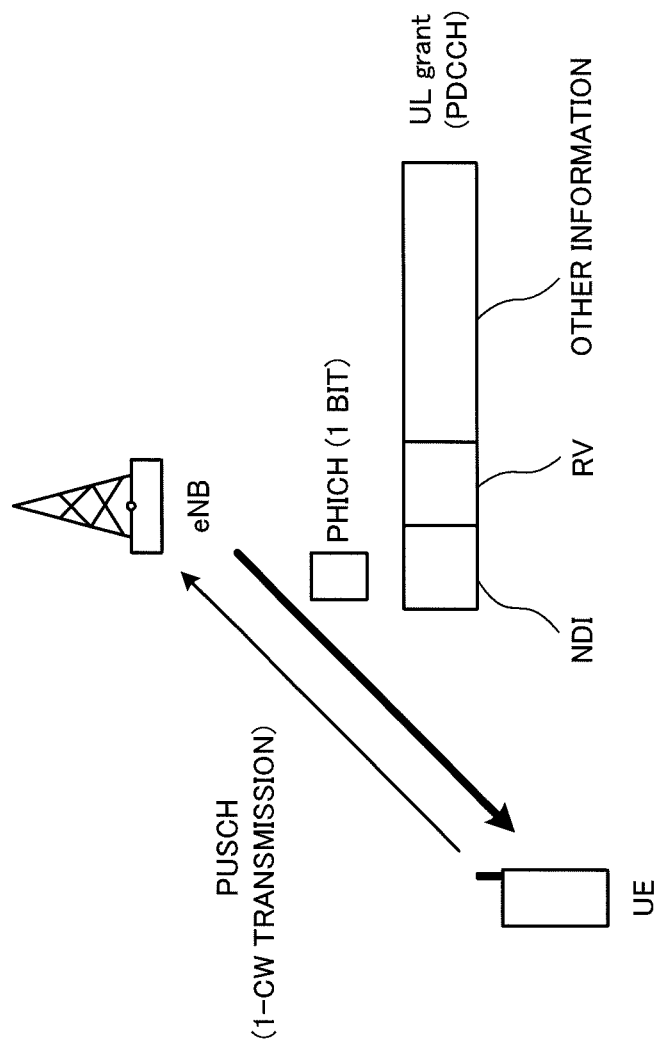
FIG. 2 is a view for explaining the HARQ control in the LTE system.

With reference to the attached drawings, embodiments of the present invention will be described in detail below. In the LTE system, MIMO multiplexing is not defined for the uplink. Accordingly, a PUSCH signal is transmitted in one code word (CW) from a mobile terminal apparatus (UE: User Equipment) to a radio base station apparatus (eNB) as illustrated in FIG. 2. Then, for the HARQ control, a positive response (ACK) (data transmission is not performed after RTD) or a negative response (NACK) (same data is resent in the same RB after RTD) is sent in the physical HARQ indicator channel (PHICH) in one bit, or an HARQ parameter is sent in the uplink grant (UL grant) of the PDCCH. Here, the HARQ parameter includes NDI (New Data Indicator), RV (Redundancy Version) in IR (Incremental Redundancy), and MCS. Here, in the LTE system, RV is contained in the TBS (Transport Block Scheme) information. Besides, when the UL grant and the PHICH are sent at the same time, the UL grant information has higher priority.

Figure 3:
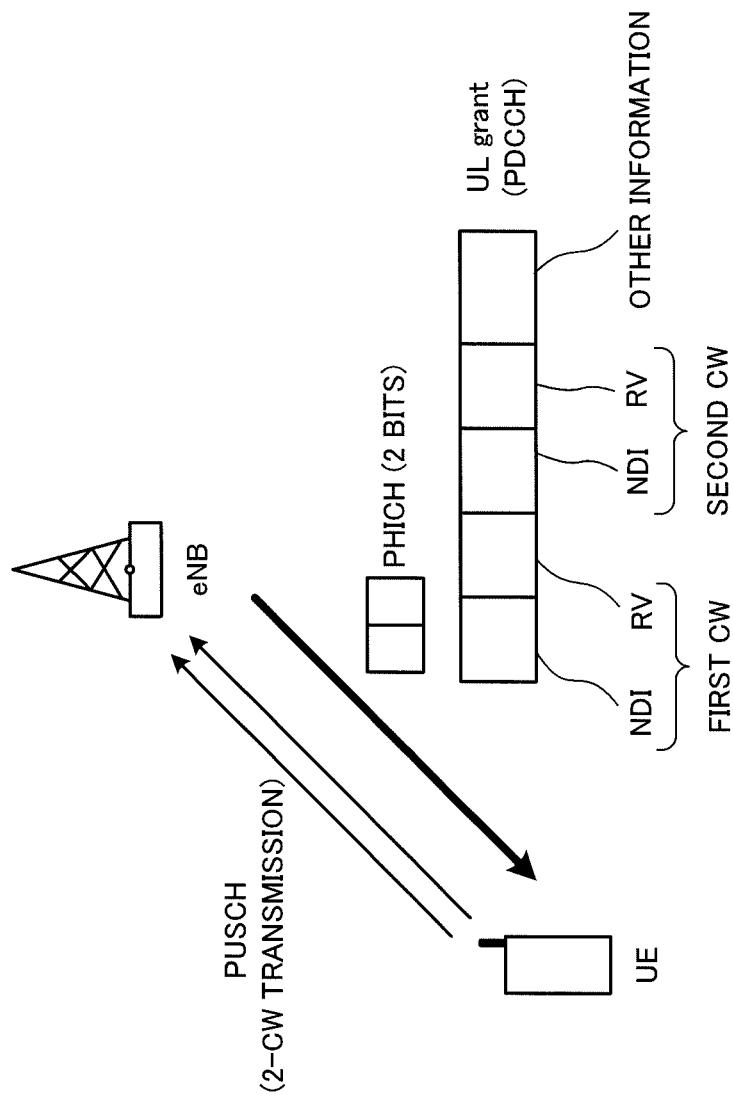
FIG. 3 is a view for explaining the HARQ control supporting the LTE-A system.

As described above, in the LTE-A system, MIMO multiplexing of four streams at the maximum is performed in the uplink and multi code word transmission capable of different HARQ control per stream is used. In such LTE-A system, if the multi code word (two code words at the maximum) is applied, the simplest way is of preparing HARQ parameter and PHICH resource for two code words. That is, as illustrated in FIG. 3, a resource (two bits) of the PHICH is prepared independently per code word, and ACK/NACK is transmitted per code word and the HARQ parameter (NDI, RV) per code word is included in the UL grant of the PDCCH. In the UL grant of the PDCCH, resource allocation information, transmission power information and other control information are combined to be transmitted, and therefore, increase in radio resources by including the HARQ parameter (NDI, RV) per code word can be minimized. On the other hand, as the PHICH resource is doubled as compared with that of the LTE system, more radio resources are spent.

Here, in consideration of the above-mentioned point, the inventors of the present invention have proposed a method for realizing effective retransmission control of uplink SU-MIMO for performing multi codeword transmission without increasing PHICH resources as compared with the LTE system. That is, the essence of the present invention is that a radio base station apparatus receives signals of plural codewords, generates a physical HARQ indicator channel signal of a negative response of 1 bit when there is an error in each of the codewords, and transmits the physical HARQ indicator channel signal, and a mobile terminal apparatus receives the physical HARQ indicator channel signal, determines whether the physical HARQ indicator channel signal is a positive response or the negative response, and transmits, to the radio base station apparatus, a retransmission signal for all the codewords by resources used in previous transmission when the physical HARQ indicator channel signal is the negative response, thereby realizing effective retransmission control of uplink SU-MIMO while saving PHICH resources enough.

Figure 4:
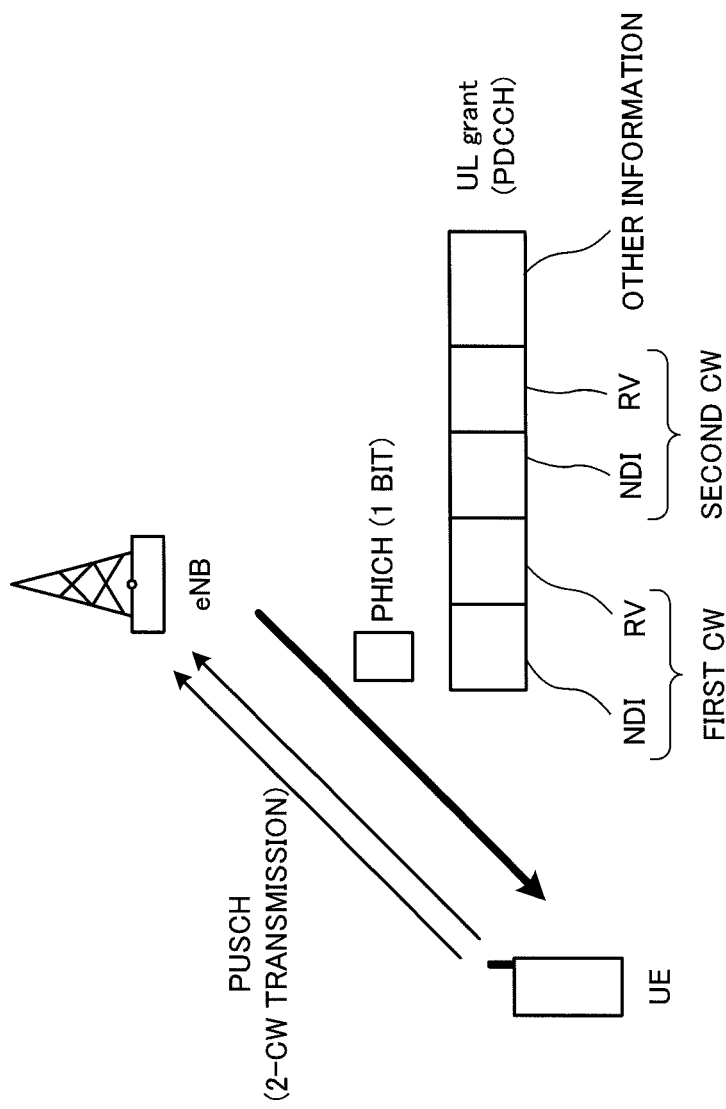
FIG. 4 is a view for explaining the HARQ control according to the present invention.

In the radio communication method according to the present invention, as illustrated in FIG. 4, the PHICH (ACK/NACK signaling) resource is of one bit (same as the resource of the LTE system), HARQ parameter of two CWs is contained in the UL grant of the PDCCH, and uplink SU-MIMO retransmission control to perform multi code word transmission is embodied effectively.

In the present invention, the NACK of the PHICH means that the same data is retransmitted from the same RB (previously transmitted RB) for all the CWs (here, two CWs) after RTD and ACK of the PHICH means transmission is not performed for all the CWs after RTD. That is, PHICHs for all CWs are bundled. And, the HARQ parameter is expressed by NDI of all CWs (two CWs) (one bit representing new data transmission/retransmission), RV in IR (contained in TBS (Transport Block Scheme) information in the UL grant of the LTE) and MCS at first transmission/retransmission. Also in this case, when the UL grant and the PHICH are transmitted simultaneously, the UL grant has higher priority.

Next description is made about the radio communication method according to the present invention. Here, in the description, it is assumed that two code words are used. The radio communication method according to the present invention includes (1) an aspect where both code words are demodulated in error in the radio base station apparatus and retransmission is requested, (2) an aspect where both code words are demodulated correctly in the radio base station apparatus and (3) an aspect where only one code word is demodulated in error in the radio base station apparatus and retransmission is requested.

(1) The aspect where both code words are demodulated in error and retransmission is requested.

The HARQ control according to this aspect is performed by (1-1) a method of sending NACK in the PHICH and (1-2) a method of requesting retransmission in the UL grant of the PDCCH.

Figure 5:
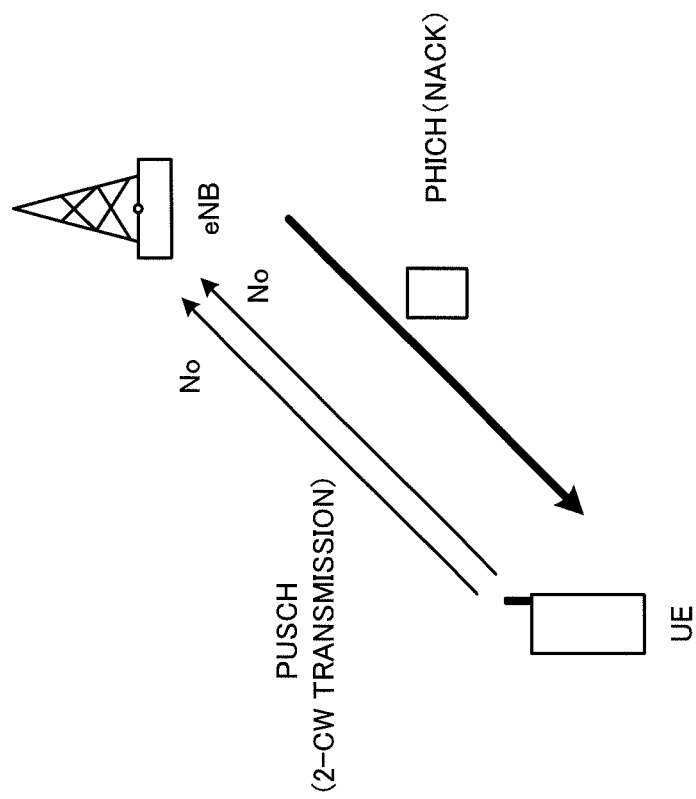
FIG. 5 is a view for explaining an aspect of the HARQ control according to the present invention.

In the method (1-1), as illustrated in FIG. 5, when the 2CW PUSCH signals are in error in the radio base station apparatus (eNB), the NACK (both CWs are in error (No)) is sent in the PHICH from the radio base station apparatus. The mobile terminal apparatus (UE) retransmits both CWs in the PUSCH. This method is suitable for non-adaptive retransmission of retransmitting in the same RB as the previously transmitted RB.

Figure 6:
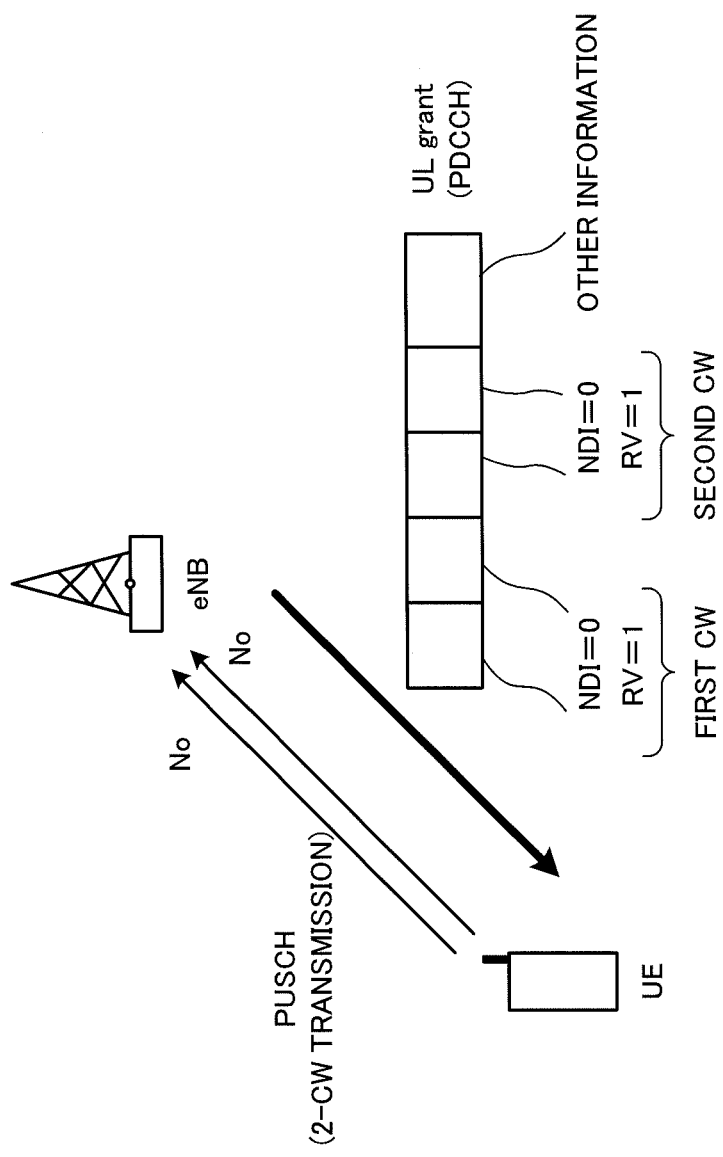
FIG. 6 is a view for explaining an aspect of the HARQ control according to the present invention.

In the method (1-2), as illustrated in FIG. 6, when the 2CW PUSCH signals are in error in the radio base station apparatus (eNB), an HARQ parameter for retransmission for 2CWs is transmitted in the PDCCH UL grant from the radio base station apparatus. The mobile terminal apparatus (UE) resends both CWs in the PUSCH. In FIG. 6, as the HARQ parameter, NDI=0 and RV=1 for the first CW and NDI=0 and RV=1 for the second CW are transmitted. Here, the NDI=1 represents new data and NDI=0 represents retransmission. Accordingly, in FIG. 6, in both of the two CWs, retransmission is requested. This method is suitable for adaptive retransmission in which a different RB is used for retransmission.

(2) The aspect where both code words are demodulated correctly The HARQ control according to this aspect is performed by (2-1) a method of requesting transmission of new data in the PDCCH UL grant and (2-2) a method of sending ACK in the PHICH.

Figure 7:
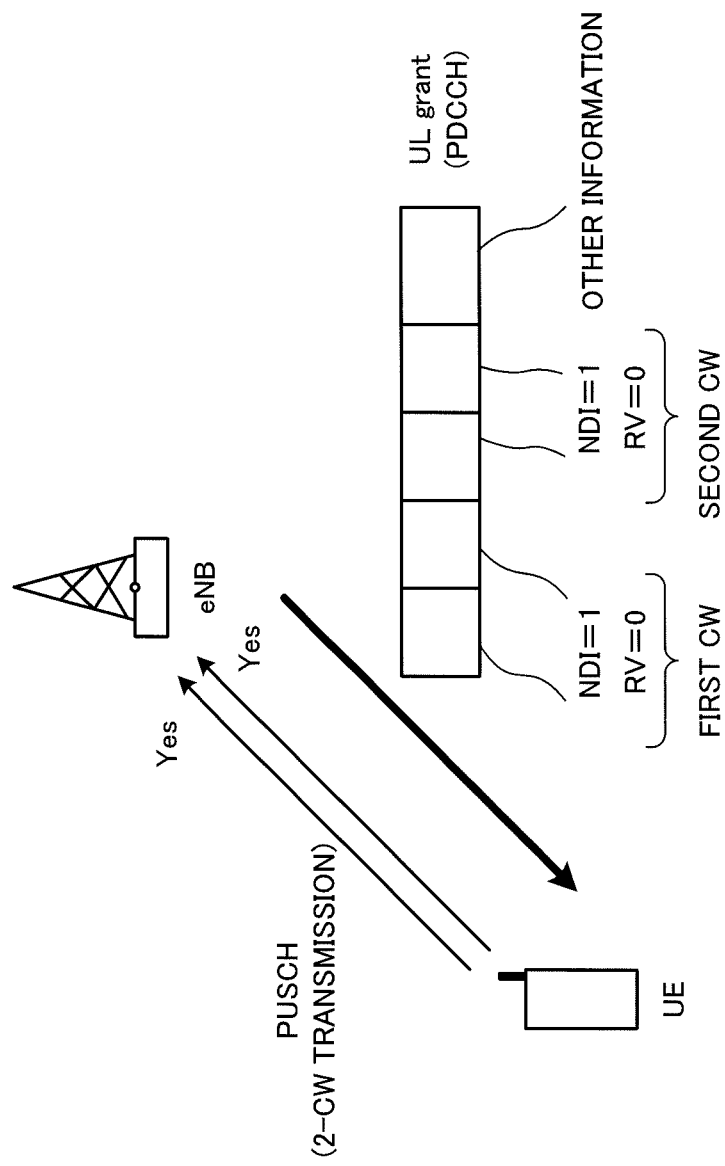
FIG. 7 is a view for explaining an aspect of the HARQ control according to the present invention.

In the method (2-1), as illustrated in FIG. 7, when there is no error in the 2CW PUSCH signals (correct) in the radio base station apparatus (eNB), if new transmission data is buffered at the UE side, an HARQ parameter for new data transmission for 2CWs is transmitted from the radio base station apparatus in the PDCCH UL grant. In FIG. 7, as the HARQ parameter, NDI=1 and RV=0 for the first CW and NDI=1 and RV=0 for the second CW are transmitted. Here, the NDI=1 represents the new data transmission and the NDI=0 represents retransmission. Accordingly, in FIG. 7, new data transmission is requested in each of the two CWs. This method is suitable for adaptive retransmission where a different RB is used in retransmission. If there is no error in the 2CW PUSCH signals (correct) and no new data is buffered, the method (2-2) is adopted.

Figure 8:
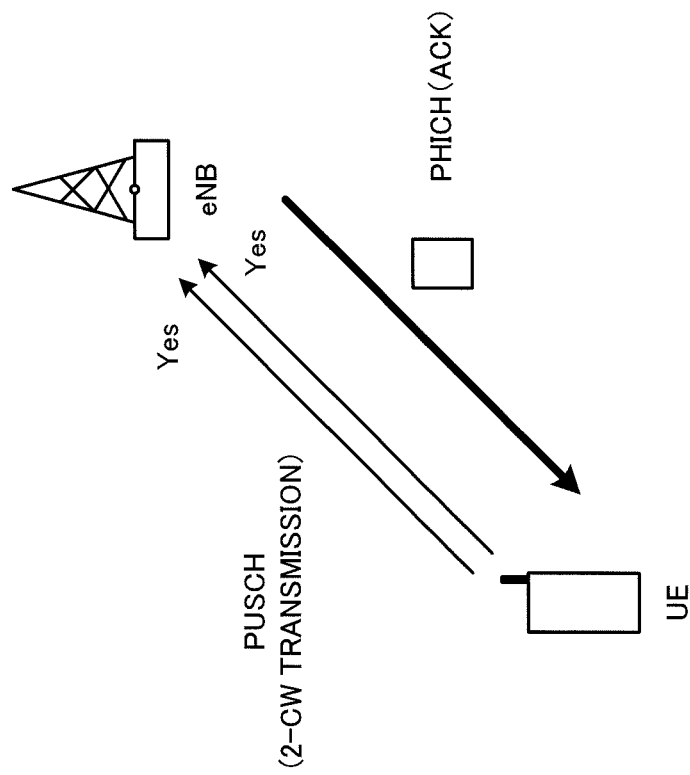
FIG. 8 is a view for explaining an aspect of the HARQ control according to the present invention.

In the method (2-2), as illustrated in FIG. 8, when there is no error in 2CW PUSCH signals (correct) in the radio base station apparatus (eNB), the radio base station apparatus sends ACK (both CWs are correct (Yes)) in the PHICH. In the mobile terminal apparatus, when new transmission data is buffered, the mobile terminal apparatus transmits the new transmission data after receiving UL grant containing a HARQ parameter to transmit the new data from the radio base station apparatus. On the other hand, in the mobile terminal apparatus, if no new transmission data is buffered, data transmission is not performed by not sending the UL grant to transmit the data after RTD. This method is suitable for Non-adaptive retransmission of retransmitting in the same RBs as the previously transmitted RBs.

(3) The aspect where only one code word is demodulated in error in the radio base station apparatus and retransmission is requested The HARQ control according to this aspect is performed by (3-1) a method of requesting retransmission UL grant of PDCCH, (3-2) a method of sending ACK in the PHICH and (3-3) a method of sending NACK in the PHICH.

Figure 9:
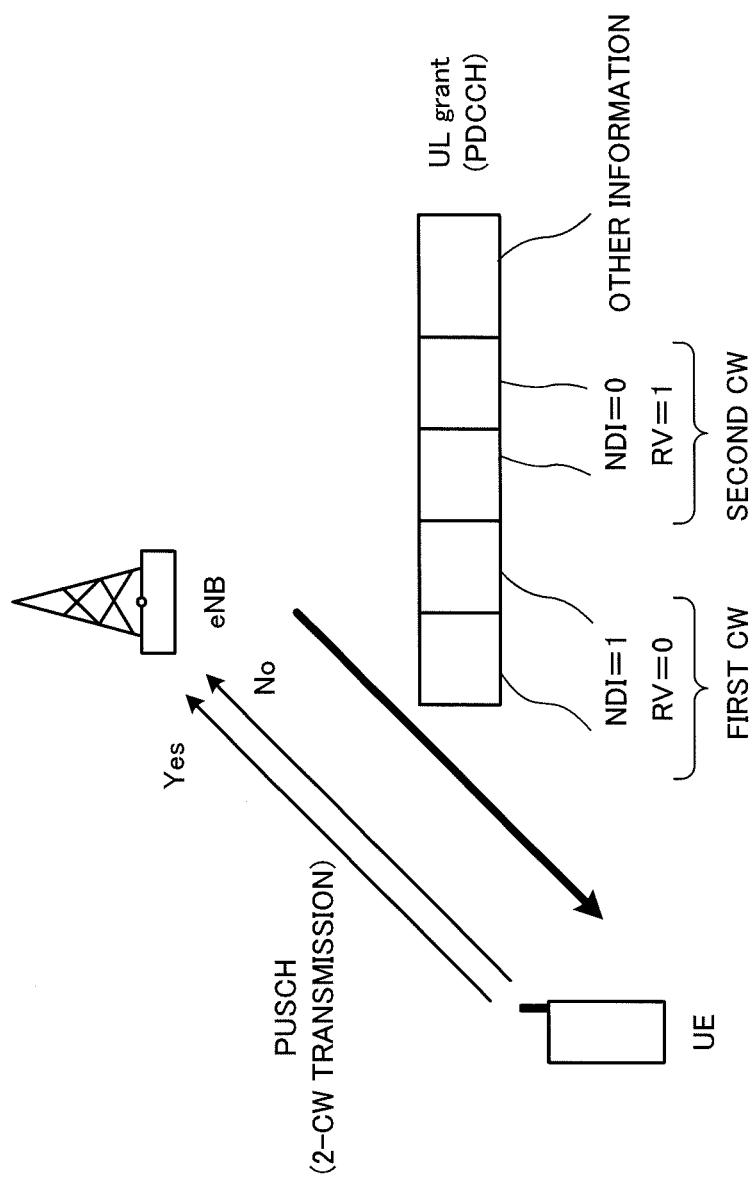
FIG. 9 is a view for explaining an aspect of the HARQ control according to the present invention.

In the method (3-1), as illustrated in FIG. 9, when there is an error in one CW (second CW) PUSCH signal and there is no error in the other CW (first CW) PUSCH signal (correct) in the radio base station apparatus (eNB), if new transmission data is buffered, the radio base station apparatus transmits an HARQ parameter for transmitting new data and an HARQ parameter for retransmission in the UL grant of the PDCCH. In FIG. 9, the HARQ parameter transmitted contains NDI=1, RV=0 for the first CW and NDI=0, RV=1 for the second CW. Here the NDI=1 represents transmission of new data and NDI=0 represents retransmission. Accordingly, in FIG. 9, new data transmission is requested for the first CW and retransmission is requested for the second CW. This method is suitable for Adaptive retransmission for using different RBs in retransmission.

Figure 10:
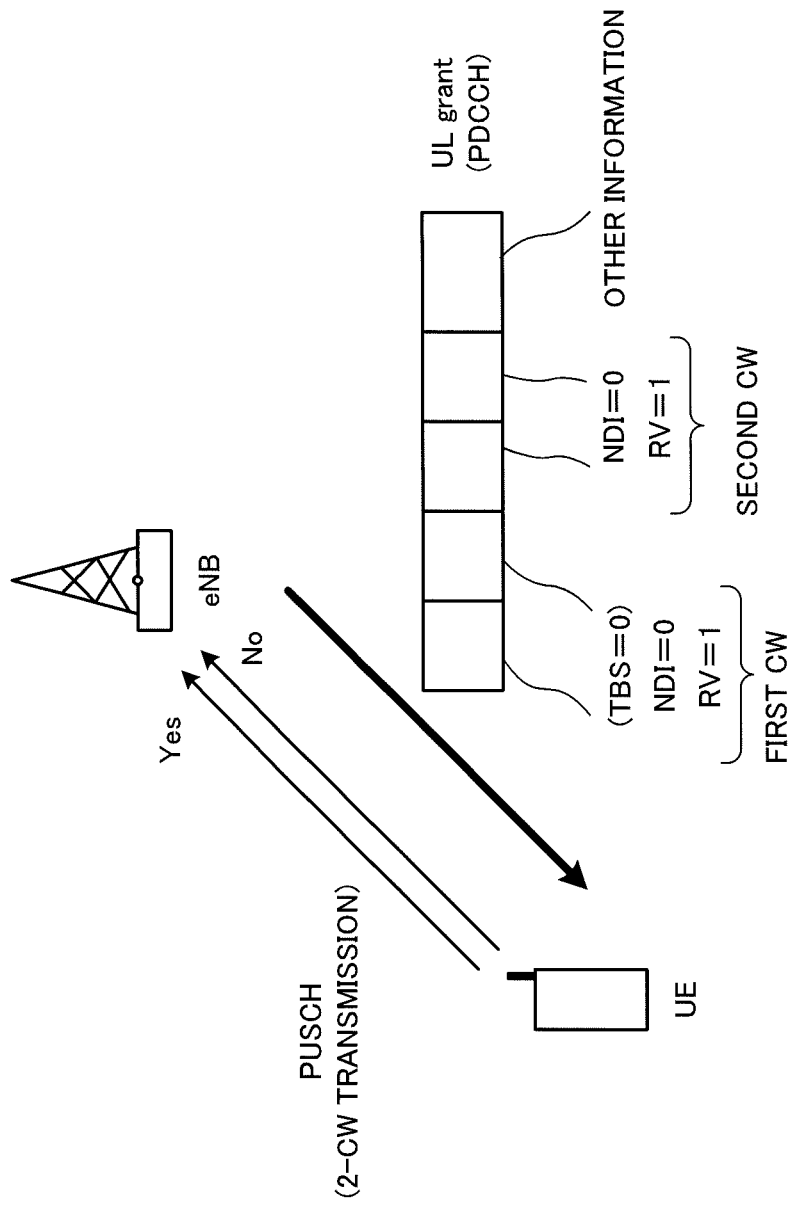
FIG. 10 is a view for explaining an aspect of the HARQ control according to the present invention.

Further, in the method (3-1), as illustrated in FIG. 10, when there is an error in one CW (second CW) PUSCH signal and there is no error in the other CW (first CW) PUSCH signal in the radio base station apparatus (eNB), if no new transmission data is buffered, the radio base station apparatus transmits an HARQ parameter for transmission disabled and an HARQ parameter for retransmission by the PDCCH UL grant. In FIG. 10, the HARQ parameter transmitted contains NDI=0, RV=1 (TBS=0) for the first CW and NDI=0, RV=1 for the second CW. Here, NDI=1 represents new data transmission and NDI=0 represents retransmission. And, TBS 0 represents transmission disabled. Accordingly, in FIG. 10, transmission disabling is requested for the first CW and retransmission is requested for the second CW. This method is suitable for Adaptive retransmission for using in different RBs in retransmission.

In the method (3-2), when there is an error in one CW (second CW) PUSCH signal and there is no error in the other CW (first CW) PUSCH signal (correct) in the radio base station apparatus (eNB), the radio base station apparatus sends ACK in the PHICH (both CWs are correct (Yes)). In this way, first, retransmission is suspended for the two CWs. Then, the mobile terminal apparatus receives UL grant containing an HARQ parameter for retransmission for the second CW from the radio base station apparatus and performs retransmission.

In the method (3-3), when there is an error in one CW (second CW) PUSCH signal and there is no error in the other CW (first CW) PUSCH signal (correct) in the radio base station apparatus (eNB), the radio base station apparatus sends NACK in the PHICH (both CWs are wrong (No)) and the CW signals are both retransmitted.

Figure 11:
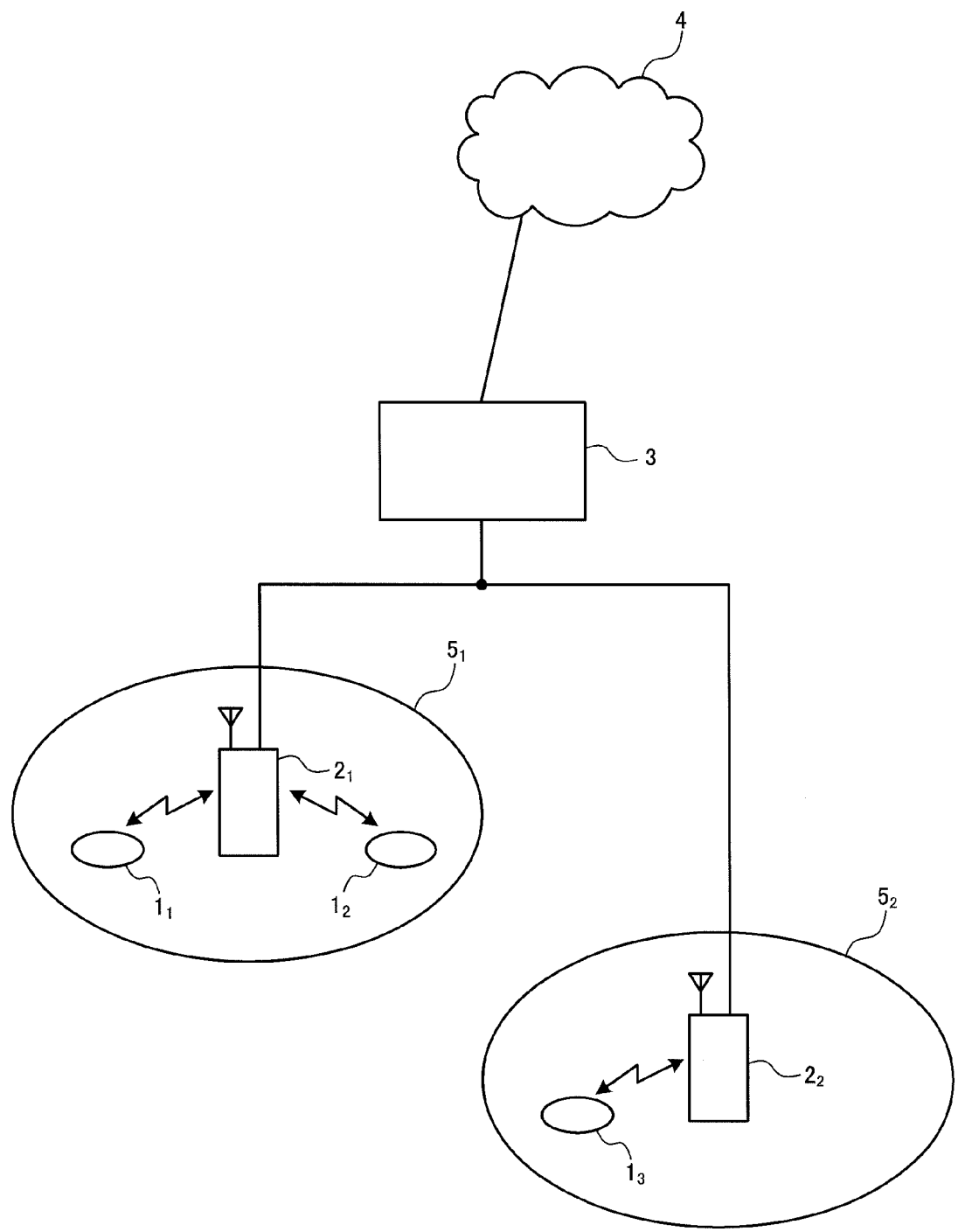
FIG. 11 is a view illustrating the radio communication system that performs the radio communication method of the present invention.

FIG. 11 illustrates a radio communication system having the radio base station apparatus and the mobile terminal apparatus according to the embodiment of the present invention.

The radio communication system is a system to which, for example, E-UTRA (Evolved UTRA and UTRAN) is applied. The radio communication system includes a radio base station apparatus (eNB: e Node B) $2$ ($2_1, 2_2, \ldots, 2_i$, "i" is an integer greater than zero) and a plurality of mobile terminal apparatus (UE) $1n$ ($1_1, 1_2, \ldots, 1_n$, "n" is an integer greater than zero). The radio base station apparatus 2 is connected to a higher level station, for example access gateway apparatus 3, which is connected to a core network 4. A mobile terminal apparatus $1_n$ communicates with the radio base station apparatus 2 in a cell 5 ($5_1, 5_2$) by E-UTRA. In this embodiment, two cells are illustrated, however, the present invention is also applicable to three or more cells in the same manner. Here, the mobile terminal apparatus ($1_1, 1_2, 1_3, \ldots, 1_n$) have same structures, functions and states. Accordingly, they are described as a mobile terminal apparatus $1_n$, unless otherwise mentioned.

In the radio communication system, the OFDM (Orthogonal Frequency Division Multiplexing) is applied to the downlink radio access system and SC-FDMA (Single-Carrier Frequency-Division Multiple. Access) is applied to the uplink radio access system. The OFDMA is a multi carrier transmission system in which a frequency band is divided into a plurality of narrower frequency bands (subcarrier) and data is mapped to each sub-carrier. The SC-FDMA is a single carrier transmission system in which a frequency band is divided into bands of respective terminals and plural mobile terminal apparatus use mutually different frequency bands thereby to reduce interference between the mobile terminal apparatus.

Here, description is made about a communication channel in E-UTRA.

In the downlink, a physical downlink shared channel (PDSCH) used in share with the mobile terminal apparatus $1_n$ and a physical downlink control channel are used. The physical downlink shared channel is called a downlink L1/L2 control channel. The above-mentioned physical downlink shared channel is used to transmit user data, that is, normal data signals. Besides, the physical downlink control channel is used to transmit downlink scheduling information (DL Scheduling Information), transmission acknowledgement information (ACK/NACK), uplink grant (UL Grant), TPC command (Transmission Power Control Command) and the like. The downlink scheduling information includes, for example, an ID of a user that performs communication with use of the physical downlink shared channel, transport format information of the user data, that is, information about data size, modulation system and retransmission control (HARQ), allocation information of downlink resource blocks. Further, the uplink scheduling grant includes, for example, an ID of a user who performs communications with use of a physical uplink shared channel, information of transport format of the user data, that is, data size, information regarding the modulation system, allocation information of resource blocks of the uplink, information regarding transmission power of the uplink shared channel and the like. Here, the uplink resource blocks correspond to frequency resources, which are also called resource units.

Further, the transmission acknowledgement information (ACK/NACK) is transmission acknowledgement information regarding the uplink shared channel. The transmission acknowledgement information is expressed by either of the positive response (ACK: Acknowledgement) that indicates a transmission signal is received properly and the negative response (NACK: Negative Acknowledgement) that indicates a transmission signal is not received properly.

In the uplink, the physical uplink shared channel (PUSCH) used in share with mobile terminal apparatus $1_n$ and a physical uplink control channel (PUCCH). The above-mentioned physical shared channel is used to transmit user data, that is, normal data signals. And, the physical uplink control channel is used to transmit downlink channel quality information (CQI: Channel Quality Indicator) used in scheduling processing of the downlink shared physical channel, adaptive modulation/demodulation and coding processing (AMC: Adaptive Modulation and Coding scheme) and physical downlink shared channel transmission acknowledgement information.

In the physical uplink control channel, a scheduling request for requesting resource allocation of the uplink shared channel and a resource request in persistent scheduling may be transmitted in addition to the CQI and the transmission acknowledgement information. Here, the resource allocation of the uplink shared channel means the physical downlink control channel of a certain sub-frame is used for the radio base station apparatus to notify the mobile terminal apparatus that the uplink shared channel may be used to perform communication in a following sub-frame.

Figure 12:
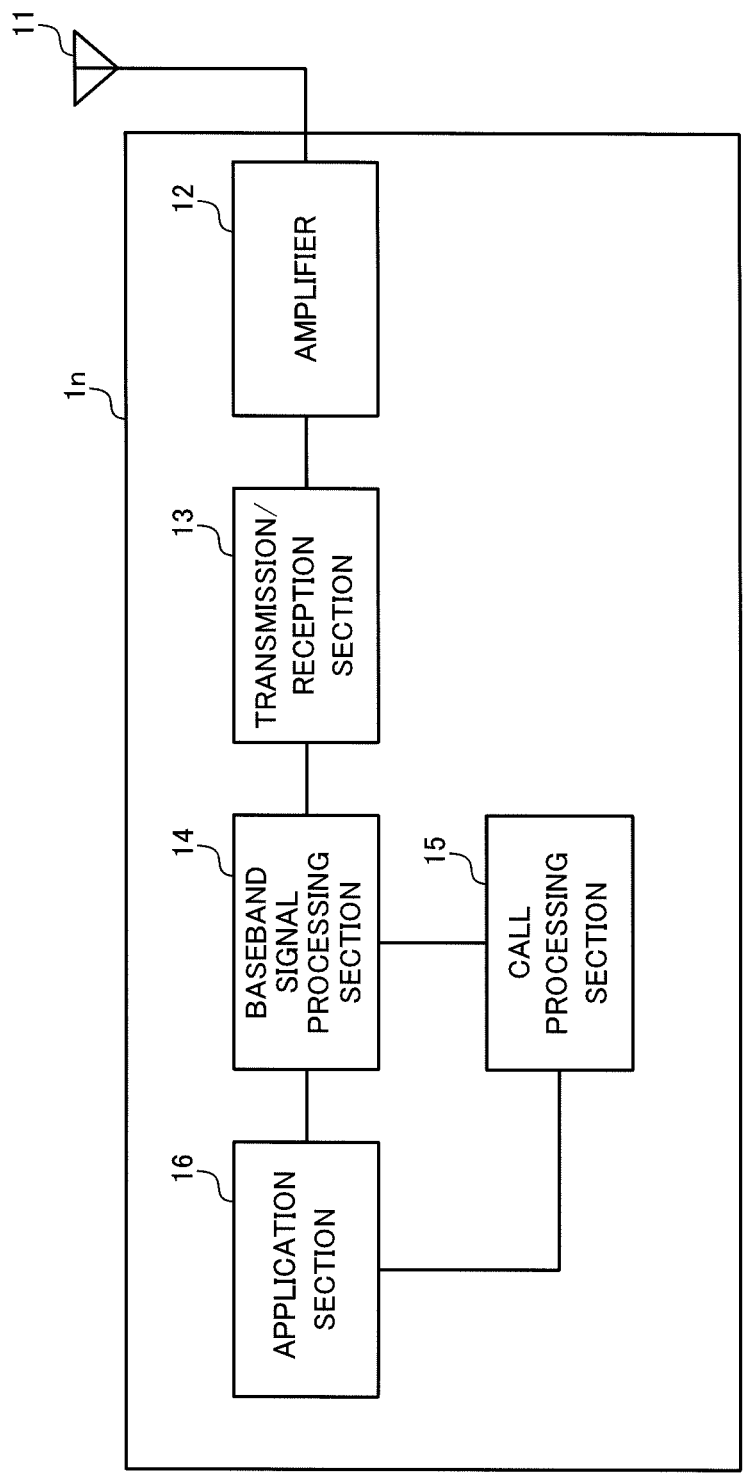
FIG. 12 is a view illustrating the overall structure of the mobile terminal apparatus of the present invention.

FIG. 12 is a block diagram schematically illustrating a configuration of the mobile terminal apparatus according to the embodiment of the present invention. The mobile terminal apparatus $1_n$ illustrated in FIG. 12 is configured to mainly include an antenna 11, an amplifier 12, a transmission/reception section 13, a baseband signal processing section 14, a call processing section 15 and an application section 16.

In the thus-configured mobile terminal apparatus $1_n$, for the downlink signal, a radio frequency signal is received by the antenna and amplified by the amplifier 12 so that the reception power is compensated to be constant under AGC (Auto Gain Control). The amplified radio frequency signal is frequency-converted to a baseband signal in the transmission/reception section 13. This baseband signal is subjected to predetermined processing (error correction and decoding) at the baseband signal processing section 14 and then sent to the call processing section 15 and the application section 16. The call processing section 15 performs management of communication with the radio base station apparatus 2 and the application section 16 performs processing about a higher level layer above the physical layer and MAC layer. The mobile terminal apparatus $1_n$ of the present invention receives downlink signals containing reference signals from plural radio base station apparatus that are related to at least downlink CoMP.

The uplink signal is input from the application section 16 to the baseband signal processing section 14. In the baseband signal processing section 14, the signal is subjected to processing of retransmission control, scheduling, transmission format selection, channel coding and the like and transferred to the transmission/reception section 13. In the transmission/reception section 13, the baseband signal output from the baseband signal processing section 14 is frequency-converted to a radio frequency signal. The frequency-converted signal is then amplified by the amplifier 12 and transmitted from the antenna 11. In the mobile terminal apparatus $1_n$ of the present invention, feedback information containing measurement results of the channel quality is transmitted to plural ratio base station apparatus.

Figure 13:
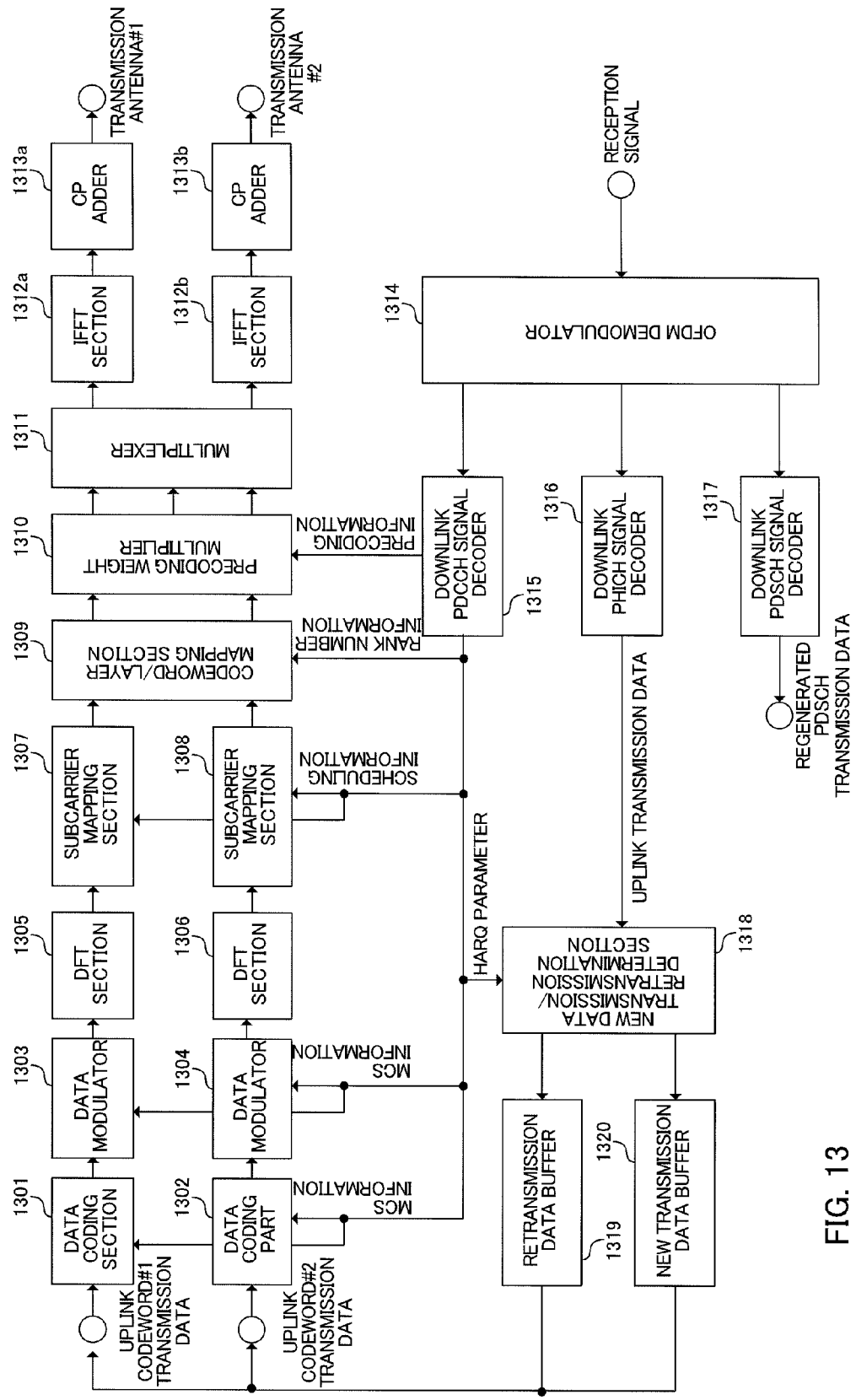
FIG. 13 is a block diagram for explaining the processing section containing the baseband processing section of the mobile terminal apparatus of the present invention.

FIG. 13 is a block diagram illustrating a configuration of the processing section that includes a baseband signal processing section in the mobile terminal apparatus illustrated in FIG. 12. The mobile terminal apparatus illustrated in FIG. 13 has a transmitter and a receiver. The transmitter has data coding sections 1301, 1302, data modulators 1303, 1304, DFT sections 1305, 1306, subcarrier mapping sections 1307, 1308, a codeword/layer mapping section 1309, a precoding weight multiplier 1310, a multiplexer 1311, IFFT sections 1312a, 1312b and CP (Cyclic Prefix) adders 1313a, 1313b.

The receiver has an OFDM demodulator 1314, a downlink PDCCH signal decoder 1315, a downlink PHICH signal decoder 1316 and a downlink PDSCH signal decoder 1317. Besides, the mobile terminal apparatus has a new data transmission/retransmission determination section 1318, a retransmission data buffer 1319 for storing retransmission data and a new transmission data buffer 1320 for storing new transmission data. Here, it is assumed that the rank number is 2 and the number of transmission antennas is two.

The receiver receives downlink signals containing a PDCCH signal, a PHICH signal and a PDSCH signal. The OFDM demodulator 1314 performs predetermined OFDM demodulation processing on the received signal. The OFDM demodulator 1314 outputs the demodulated signal to a downlink PDCCH signal decoder 1314, a downlink PHICH signal decoder 1316 and a PDSCH signal decoder 1317.

The downlink PDCCH signal decoder 1315 decodes the demodulated downlink PDCCH signal (downlink L1/L2 control signal). The downlink PDCCH signal decoder 1315 outputs the decoded downlink PDCCH signal to the data coders 1301, 1302, the data modulators 1303, 1304, subcarrier mapping sections 1307, 1308, the codeword/layer mapping section 1309, the precoding weight multiplier 1310 and the new data transmission/retransmission judging section 1318.

In other words, the RI (rank number information) is output to the codeword/layer mapping section 1309, MCS information is output to the data coders 1301, 1302 and the data modulators 1303, 1304, scheduling information (resources allocation information) is output to the subcarrier mapping sections 1307, 1308 and the precoding information (PMI) is output to the precoding weight multiplier 1310. In addition, the HARQ parameter contained in the UL grant is output to the new data transmission/retransmission judging section 1318.

The downlink PHICH signal decoder 1316 decodes the demodulated downlink PHICH signal. With this decoding, the PHICH signal (ACK or NACK) is obtained. Besides, the downlink PHICH signal decoder 1316 outputs the demodulated downlink PHICH signal to the new data transmission/ retransmission judging section 1318. The downlink PDSCH signal decoder 1317 decodes the demodulated downlink data signal.

The new data transmission/retransmission judging section 1318 determines whether the PHICH signal is ACK or NACK. Besides, when the PHICH signal is NACK, the new data transmission/retransmission judging section 1318 provides retransmission instruction (instruction to transmit a retransmission signal to the radio base station apparatus) for all CWs (here, two CWs). With this instruction, the mobile terminal apparatus retransmits, in the PUSCH, retransmission signals of the two CWs stored in the retransmission data buffer 1319. This control is performed in the aspect (1-1) in which both code words are demodulated in error and retransmission is performed and in the aspect (3-3) in which either code word is demodulated in error and retransmission is performed.

Further, when the PHICH signal is ACK, if new transmission data is buffered in the new transmission data buffer 1320, the new data transmission/retransmission judging section 1318 provides an instruction to transmit the new transmission data after receiving the UL grant including an HARQ parameter of the new data transmission from the radio base station apparatus. On the other hand, if no new transmission data is not buffered in the new transmission data buffer 1320, data transmission is not performed after RTD. This control is performed in the aspect (2-2) in which both code words are demodulated correctly and in the aspect (3-2) in which either code word is demodulated in error and retransmission is performed.

Further, the new data transmission/retransmission judging section 1318 provides an instruction of new data transmission and/or retransmission based on the UL grant of the PDCCH. If UL grant which indicates retransmission to one CW is contained in the downlink PDCCH signal, it provides an instruction to retransmit to the one CW (instruction to transmit a retransmission signal to the radio base station apparatus). This control is performed in the aspect (1-2) in which both code words are demodulated in error and retransmission is performed, the aspect (2-1) in which both code words are demodulated correctly and the aspect (3-1) in which either code word is only demodulated in error and retransmission is performed.

The data coders 1301, 1302 use channel coding rates corresponding to the MCS information to perform error correction coding of the data signals. The data coders 1301, 1302 output the error corrected-data signals to the data modulators 1303, 1304.

The data modulators 1303, 1304 modulates the data coded-data signals by a data modulation scheme corresponding to the MSC information. The data modulators 1303, 1304 outputs the data modulated data signals to the DFT (Discrete Fourier Transform) sections 1305, 1306. The DFT sections 1305, 1306 convert the time-series data signals to frequency-domain signals. The DFT sections 1305, 1306 output the converted data signals to subcarrier mapping sections 1307, 1308.

The subcarrier mapping sections 1307, 1308 map the converted data signals to subcarriers based on scheduling information. The subcarrier mapping sections 1307, 1308 output the subcarrier mapped data signals to the code word/layer mapping section 1309.

The code word/layer mapping section 1309 maps the code words to the layers based on the rank number information. The code word/layer mapping section 1309 outputs the mapped signals to the precoding weight multiplier 1310. The precoding weight multiplier 1310 multiplies the signals mapped based on the precoding information by a precoding weight. The precoding weight multiplier 1310 outputs the multiplied signal to the multiplexer 1311.

The multiplexer 1311 multiplexes another signal such as a reference signal to the multiplied data signal. The multiplexer 1311 outputs the signal multiplexed with the reference signal or the like to the IFFT (Inverse Fast Fourier Transform) sections 1312a, 1312b. The IFFT sections 1312a, 1312b perform IFFT on the multiplexed signals and convert the signal to time domain signals. The IFFT sections 1312a, 1312b output the converted signals to the CP adders 1313a, 1313b. The CP adders 1313a, 1313b adds CPs to the converted signals.

Figure 14:
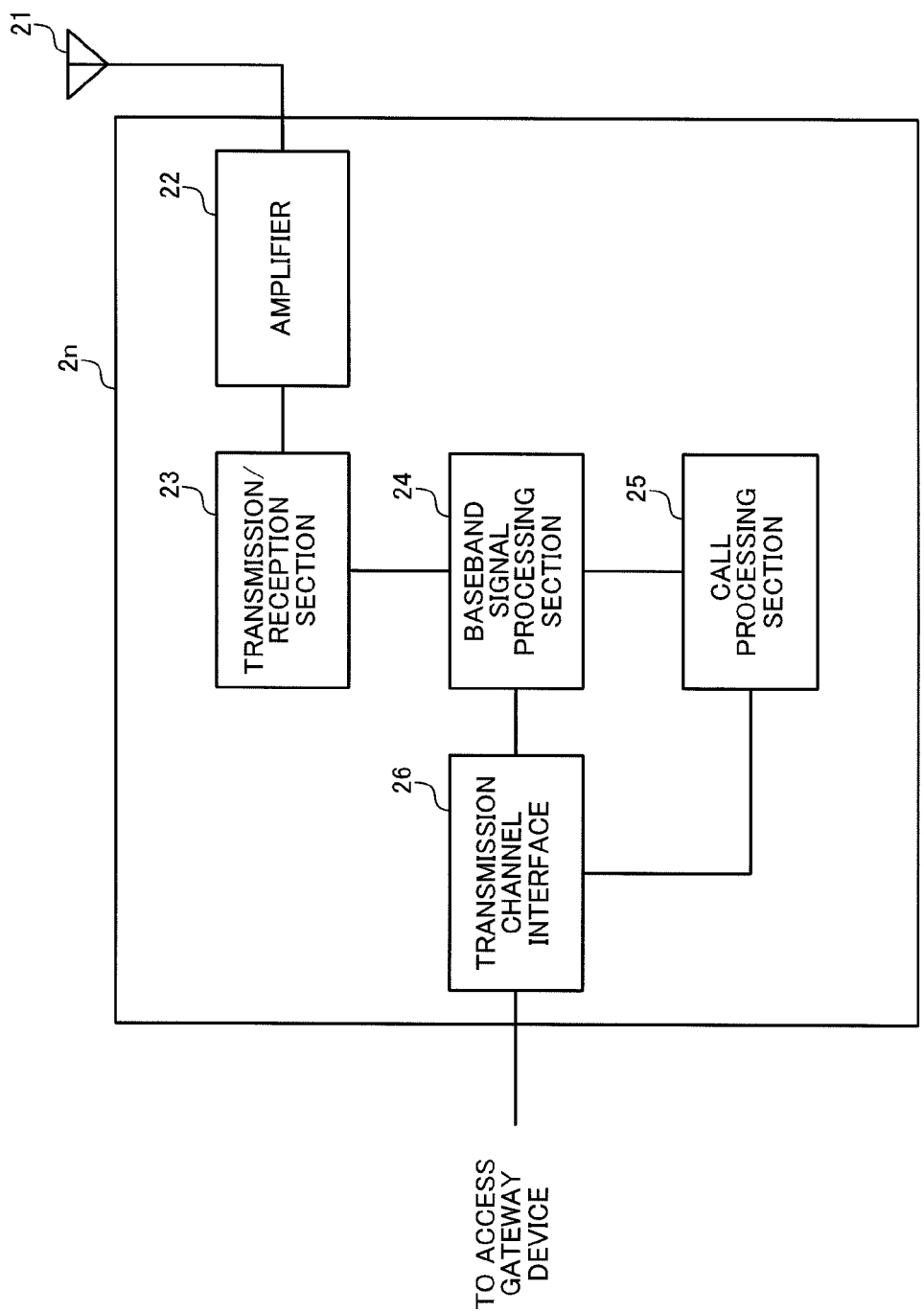
FIG. 14 is a view illustrating the outline structure of the radio base station apparatus of the present invention.

FIG. 14 is a block diagram schematically illustrating a configuration of the radio base station apparatus according to the embodiment of the present invention. The radio base station apparatus $2_n$ illustrated in FIG. 14 is configured to mainly include an antenna 21, an amplifier 22, a transmission/reception section 23, a baseband signal processing section 24, a call processing section 25 and a transmission channel interface 26.

In the thus-configured radio base station apparatus $2_n$, for the uplink signal, the radio frequency signal is received by the antenna 21 and amplified by the amplifier 22 so that the reception power is amplified to be constant power under AGC. The amplified radio frequency single is frequency-converted to the baseband signal at the transmission/reception section 23. This baseband signal is subjected to predetermined processing (error correction, decoding and the like) at the base band signal processing section 24 and transferred to the access gateway via the transmission channel interface 26. The access gateway 3 is connected to the core network 4 and controls each of the mobile terminal apparatus. And in the uplink, the uplink baseband signal is used to measure the reception SINR and interference level of a radio frequency signal received by the radio base station apparatus $2_n$. The call processing section 25 transmits and receives call processing control signals to and from a higher-level radio control station to perform status management of the radio base station apparatus $2_n$ and resource allocation.

The downlink signal is input from a higher level apparatus to the baseband signal processing section 24 via the transmission channel interface 26. The baseband signal processing section 24 performs processing of retransmission control, scheduling, transmission format selection, channel coding and the like on the signal and transfers it to the transmission/reception section 23. The transmission/reception section 23 receives the baseband signal from the baseband signal processing section 24 and frequency-converts the baseband signal to a radio frequency signal. The frequency converted signal is then amplified by the amplifier 22 and transmitted from the antenna 21.

Figure 15:
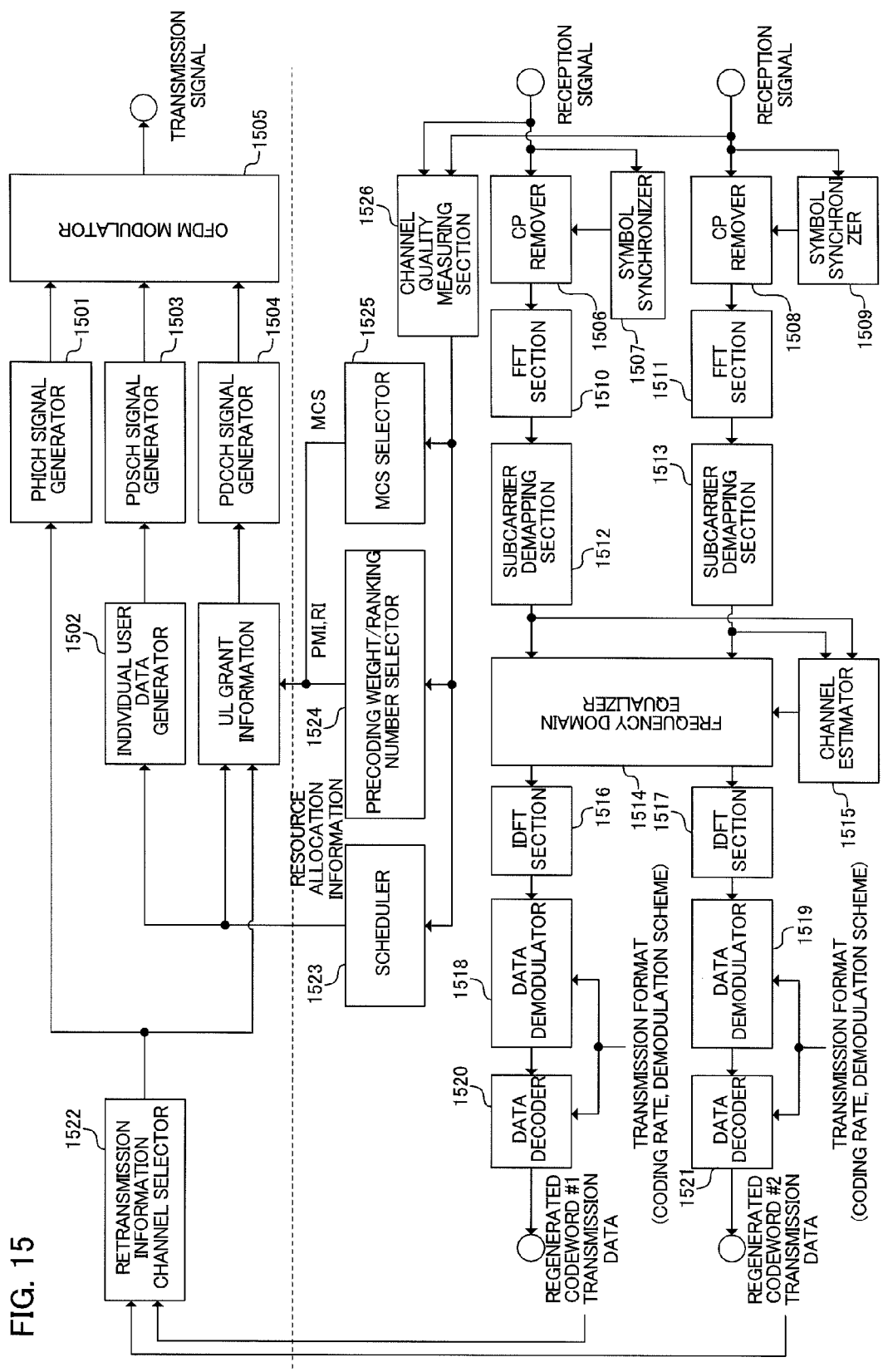
FIG. 15 is a block diagram for explaining the processing section containing the baseband processing section of the radio base station apparatus of the present invention.

FIG. 15 is a block diagram illustrating a configuration of the processing section including the baseband signal processing section in the radio base station apparatus illustrated in FIG. 14. The radio base station apparatus illustrated in FIG. 15 has a transmitter and a receiver. The transmitter has a PHICH signal generator 1501, an individual user data generator 1502, a PDSCH signal generator 1503, a PDCCH signal generator 1504 and an OFDM modulator 1505. The transmitter transmits a downlink signal containing the PHICH signal, the PDSCH signal and the PDCCH signal to the mobile terminal apparatus.

The receiver has CP removers 1506, 1508, symbol synchronizers 1507, 1509, FFT (Fast Fourier Transform) sections 1510, 1511, subcarrier demapping sections 1512, 1513, a frequency domain equalizer 1514, a channel estimator 1515, IDFT (Inverse Discrete Fourier Transform) sections 1516, 1517, data demodulators 1518, 1519, and data decoders 1520, 1521. And, the radio base station apparatus has a retransmission information channel selector 1522, a scheduler 1523, a precoding weight/ranking number selector 1524, an MCS selector 1525 and a channel quality measuring section 1526. The receiver receives plural (here, two) CW signals from the mobile terminal apparatus.

The PHICH signal generator 1501 generates a PHICH signal (ACK/NACK). This PHICH signal is selected depending on whether there is an error in the PUSCH signal (regenerated CW #1 transmission data, regenerated CW #2 transmission data). When there is error in all CWs, the PHICH signal generator 1501 generates a one-bit PHICH (NACK). And, when there is no error in all CWs, the PHICH signal generator 1501 generates a one-bit PHICH (ACK). The PHICH signal generator 1501 outputs the PHICH signal to the OFDM modulator 1505.

The individual user data generator 1502 generates downlink individual user data and outputs the data to the PDSCH signal generator 1503. The PDSCH signal generator 1503 generates a downlink individual user data and higher layer control signal (RRC signaling) as the PDSCH signal. The PDSCH signal generator 1503 outputs the PDSCH signal to the OFDM modulator 1505.

The PDCCH signal generator 1504 generates the PDCCH signal containing uplink grant (UL grant). The UL grant includes resource allocation information, PMI, RI (Rank Indicator), MCS, and HARQ parameter (NDI, RV, MCS). The PDCCH signal generator 1504 generates the PDCCH signal containing UL grant that indicates that retransmission is performed for one CW when there is an error in this one CW. The PDCCH signal generator 1504 outputs the PDCCH signal to the OFDM modulator 1505. The OFDM modulator 1505 performs predetermined OFDM modulation processing on the PHICH signal, the PDSCH signal and the PDCCH signal and outputs them as transmission signals.

The CP removers 1506, 1508 remove CPs from the reception signals on the antenna basis and extract valid signal sections. The CP removers 1506, 1508 output the CP removed reception signals to the FFT sections 1510, 1511. The symbol synchronizers 1507, 1509 make symbol synchronization of the respective reception signals and output the symbol synchronization information to the CP removers 1506, 1508. The CP removers 1506, 1508 remove CPs from the reception signals based on the symbol synchronization information.

The FFT sections 1510, 1511 perform FFT on the CP removed received signals and convert them into frequency domain signals. The FFT sections 1510, 1511 output the converted signals to the subcarrier demapping sections 1512, 1513. The subcarrier demapping sections 1512, 1513 extract data signals from the converted frequency domain signals with use of the resource mapping information. The subcarrier demapping sections 1512, 1513 outputs the subcarrier demapped signals to the channel estimator 1515 and the frequency domain equalizer 1514.

The channel estimator 1515 performs channel estimation with use of the subcarrier demapped signal (reference signal). The channel estimator 1515 outputs the obtained channel estimation value to the frequency domain equalizer 1514. The frequency domain equalizer 1514 compensates cannel fluctuation of the subcarrier demapped data signal estimated by the channel estimator 1515. The frequency domain equalizer 1514 outputs the equalized data signals to the IDFT sections 1516, 1517. The IDFT sections 1516, 1517 convert the frequency domain signals to the time domain signals. The IDFT sections 1516, 1517 outputs the converted signal to the data demodulators 1518, 1519, respectively.

The data demodulators 1518, 1519 demodulates the converted signals by a data modulation scheme corresponding to the transmission format (coding rate/demodulation system). The data demodulators 1518, 1519 output the data demodulated signals to the data decoders 1520, 1521, respectively. The data decoders 1520, 1521 decode the demodulated data signals and output them as transmission data (regenerated CW #1 transmission data, regenerated CW #2 transmission data).

The channel quality measuring section 1526 measures quality information with use of the reference signal transmitted from the mobile terminal apparatus. The measured quality information is output to the scheduler 1523, the precoding weight/rank number selector 1524 and the MCS selector 1525.

In the scheduler 1523, scheduling is performed based on the quality information. The scheduler 1523 outputs the resource allocation information to the individual user data generator 1502 and the PDCCH signal generator 1504. The precoding weight/rank number selector 1524 performs PMI generation and rank selection based on the quality information. The precoding weight/rank number selector 1524 outputs the PMI and the RI to the PDCCH signal generator 1504. The MCS selector 1525 performs MCS selection based on the quality information. The MCS selector 1525 outputs the MCS to the PDCCH signal generator 1504.

The retransmission information channel selector 1522 decides whether retransmission is notified by the PHICH or UL grant in accordance with the error state of the transmission data of each CW. The retransmission information channel selector 1522 decides retransmission by the PHICH (NACK) and selects the PHICH in the case of the aspect (1-1) in which both code words are demodulated in error and retransmission is performed or in the aspect (3-3) in which either code word is only demodulated in error and retransmission is performed.

Further, in the case of the aspect (2-2) in which both code words are demodulated correctly and the aspect (3-2) in which either code word is only demodulated in error and retransmission is performed, the retransmission information channel selector 1522 selects the PHICH to notify retransmission by the PHICH (ACK). Here, in this case, if new transmission data is buffered in the new transmission data buffer 1320 of the mobile terminal apparatus, the retransmission information channel estimator 1522 decides to transmit UL grant containing the HARQ parameter of the new data transmission and selects the PDCCH to notify this retransmission information.

Further, the retransmission channel estimator 1522 selects the PDCCH to notify retransmission by UL grant of the PDCCH in the case of the aspect (1-2) in which both ode words are demodulated in error and retransmission is performed, the aspect (2-1) in which both code words are demodulated correctly and the aspect (3-1) in which either code word is demodulated in error and retransmission is performed.

In the thus-configured radio communication system, when both CWs are demodulated in error in the radio base station apparatus and retransmission is performed, the radio base station apparatus receives signals of plural CWs, generates a one-bit NACK PHICH signal, and transmits this NACK PHICH signal to the mobile terminal apparatus. The mobile terminal apparatus transmits retransmission signals for all CWs to the radio base station apparatus in accordance with the NACK PHICH.

Further, in this radio communication system, both CWs are demodulated correctly in the radio base station apparatus, the radio base station apparatus generates a one-bit ACK PHICH signal and transmits this ACK PHICH signal to the mobile terminal apparatus. The mobile terminal apparatus transmits new transmission data to the radio base station apparatus based on the ACK PHICH signal.

Further, in this radio communication system, when only one CW is demodulated in error in the radio base station apparatus and retransmission is to be performed, the radio base station apparatus generates a PDCCH signal containing UL grant that indicates retransmission for the one CW and sends this PDCCH signal to the mobile terminal apparatus. The mobile terminal apparatus transmits the one-CW retransmission signal to the radio base station apparatus based on the UL grant.

The present invention is not restricted to the above-described embodiment and may be embodied in various modified forms. In the above-described embodiment, the rank number and the number of transmission antennas are given by way of example and are not intended for limiting the present invention. Besides, the number of processing sections and processing procedure described above may be modified appropriately without departing from the scope of the present invention. Further, elements illustrated in figures are represented by their functions, and each functional block may be realized by hardware or software. Any other modification may be also made without departing from the scope of the present invention.

INDUSTRIAL APPLICABILITY

The present invention is useful for a mobile terminal apparatus, a radio base station apparatus and a radio communication method of the LTE-A system.

The present specification is based on Japanese Patent Applications No. 2010-034551 filed on Feb. 19, 2010, the entire contents of which are expressly incorporated by reference herein.

The invention claimed is:

1. A mobile terminal apparatus comprising:
a receiving section configured to receive a physical HARQ indicator channel signal;
a determining section configured to determine whether the physical HARQ indicator channel signal is a positive response or a negative response;
a transmitting section configured to transmit retransmission signals for a plurality of codewords to a radio base station apparatus when the physical HARQ indicator channel signal is the negative response, and to suspend retransmission for the plurality of codewords to the radio base station apparatus when the physical HARQ indicator channel signal is determined to be the positive response, wherein
the receiving section receives a downlink control channel signal, and
the transmitting section transmits, when the downlink control channel signal includes an uplink grant that indicates retransmission for one codeword of the plurality of codewords, a retransmission signal of the one codeword of the plurality of codewords to the radio base station apparatus after suspending the retransmission for the plurality of codewords when the physical HARQ indicator channel signal is determined to be the positive response.

2. The mobile terminal apparatus of claim 1, wherein when the physical HARQ indicator channel signal is the positive response, neither new transmission data nor the retransmission signals are transmitted to the radio base station apparatus.

3. A radio base station apparatus comprising:
a receiving section configured to receive signals of a plurality of codewords;
a physical HARQ indicator channel signal generating section configured to generate a one-bit negative response physical HARQ indicator channel signal when there is an error in each codeword of the plurality of codewords and to generate a one-bit positive response physical HARQ indicator channel signal when there is an error in one codeword of the plurality of codewords;
a downlink control channel signal generating section configured to generate a downlink control channel signal including uplink that indicates retransmission for the one codeword of the plurality of codewords when there is an error in the one codeword of the plurality of codewords; and
a transmitting section configured to transmit the one-bit positive response physical HARQ indicator channel signal and the downlink control channel signal to a mobile terminal apparatus when there is an error in the one codeword of the plurality of codewords, wherein
the mobile terminal apparatus transmits, when the downlink control channel signal includes the uplink grant, a retransmission signal of the one codeword of the plurality of codewords to the radio base station as apparatus after suspending the retransmission for the plurality of codewords in response to receiving the one-bit positive response physical HARQ indicator channel signal.

4. The radio base station apparatus of claim 3, wherein when there is no error in the plurality of codewords, the physical HARQ indicator channel signal generating section generates a one-bit positive response physical HARQ indicator channel signal and the transmitting section transmits the one-bit positive response physical HARQ indicator channel signal to a mobile terminal apparatus.

5. A radio communication method comprising:
in a radio base station apparatus,
receiving signals of a plurality of codewords;
generating a one-bit negative response physical HARQ indicator channel signal when there is an error in each of the plurality of codewords and generating a one-bit positive response physical HARQ indicator signal when there is an error in one of the plurality of codewords;
transmitting the one-bit negative response physical HARQ indicator channel signal or the one-bit positive response physical HARQ indicator channel signal to a mobile terminal apparatus;
generating a downlink channel signal including an uplink grant that indicates retransmission for the one codeword of the plurality of codewords when there is an error in the one codeword of the plurality of codewords;
transmitting the downlink control channel signal to the mobile terminal apparatus;
in a mobile terminal apparatus,
receiving the one-bit negative response physical HARQ indicator channel signal or the one-bit positive response physical HARQ indicator channel signal;
receiving the downlink control channel signal;
transmitting retransmission signals of the plurality of codewords to the radio base station apparatus based on the one-bit negative response physical HARQ indicator channel signal; and transmitting, when the downlink control channel signal includes the uplink grant, a retransmission signal of the one codeword of the plurality of codewords to the radio base station apparatus after suspending the retransmission for the plurality of codewords in response to receiving the one-bit positive response physical HARQ indicator channel signal.

6. The radio communication method of claim 5, further comprising, in the radio base station apparatus, when there is no error in any codeword of the plurality of codewords, generating a one-bit positive response physical HARQ indicator channel signal, transmitting the one-bit positive response physical HARQ indicator channel signal to the mobile terminal apparatus; in the mobile terminal apparatus, receiving the one-bit positive response physical HARQ indicator channel signal; and not transmitting a retransmission signal and new transmission data to the radio base station apparatus based on the one-bit positive response physical HARQ indicator channel signal.

\* \* \* \* \*